(12) United States Patent
Pautet et al.

(10) Patent No.: US 7,239,001 B2
(45) Date of Patent: Jul. 3, 2007

(54) TUNABLE OPTICAL FILTERING COMPONENT

(75) Inventors: Christophe Pautet, Vaulx-Milieu (FR); Xavier Hugon, Coublevie (FR)

(73) Assignee: Atmel Grenoble S.A., Saint-Egreve (FR)

( * ) Notice: Subject to any disclaimer, the term of this patent is extended or adjusted under 35 U.S.C. 154(b) by 314 days.

(21) Appl. No.: 10/492,184

(22) PCT Filed: Nov. 15, 2002

(86) PCT No.: PCT/FR02/03920

§ 371 (c)(1),
(2), (4) Date: Apr. 9, 2004

(87) PCT Pub. No.: WO03/042729

PCT Pub. Date: May 22, 2003

(65) Prior Publication Data

US 2005/0018331 A1    Jan. 27, 2005

(30) Foreign Application Priority Data

Nov. 16, 2001   (FR) .................................. 01 14856

(51) Int. Cl.
*H01L 33/00* (2006.01)
*H01L 31/0216* (2006.01)
(52) U.S. Cl. .................. 257/440; 257/444; 257/431; 257/184; 257/E31.121; 257/E33.076; 359/885
(58) Field of Classification Search ..................... None
See application file for complete search history.

(56) References Cited

U.S. PATENT DOCUMENTS

| | | | |
|---|---|---|---|
| 5,022,745 A | 6/1991 | Zayhowski et al. | |
| 5,291,502 A | 3/1994 | Pezeshki et al. | |
| 5,329,136 A * | 7/1994 | Goossen ...................... | 257/17 |
| 5,629,951 A | 5/1997 | Chang-Hasnain et al. | |
| 5,646,729 A | 7/1997 | Koskinen et al. | |
| 6,295,130 B1 | 9/2001 | Sun et al. | |
| 6,665,076 B1 * | 12/2003 | Watterson et al. .......... | 356/454 |
| 6,687,423 B1 * | 2/2004 | Yao ............................. | 385/11 |
| 7,095,776 B2 * | 8/2006 | Kuznetsov et al. ........... | 372/98 |
| 2002/0163643 A1 * | 11/2002 | Li et al. ...................... | 356/450 |
| 2003/0020926 A1 * | 1/2003 | Miron ......................... | 356/519 |

* cited by examiner

Primary Examiner—Evan Pert
Assistant Examiner—Victor A. Mandala, Jr.
(74) *Attorney, Agent, or Firm*—Lowe Hauptman & Berner, LLP

(57) ABSTRACT

The invention relates to wavelength-selective and tunable optical filters for transmitting the light in a narrow optical spectral band, centered around an adjustable wavelength, and for blocking the transmission of wavelengths lying outside of this band.

In a micromachined monolithic structure containing the optical filter proper, the component comprises a low-absorption light detection element used for slaving the tuning control of the filter to a wavelength received by the filter, this element transmitting the majority of the radiation at this wavelength. The filter is a Fabry-Pérot interferometric filter, the cavity (C) of which is tuned to a value that maximizes the power detected by the light detection element. The filter is preferably based on layers of indium phosphide and air gaps. The detection element preferably comprises a layer of gallium-indium arsenide 74 suitable for detection of the intended wavelength band.

20 Claims, 2 Drawing Sheets

TUNABLE OPTICAL FILTERING COMPONENT

FIELD OF THE INVENTION

The invention relates to wavelength-selective and tunable optical filters for transmitting light in a narrow optical spectral band, centered around an adjustable wavelength, and for blocking the transmission of wavelengths lying outside of this band. The central wavelength of the narrow spectral band is adjusted by electrical means.

BACKGROUND OF THE INVENTION

The word "light" is intended—in the wide sense and includes, in particular, spectral bands in the infrared as will be seen below, a major application of the invention being to filter light in the various fiber-optic telecommunication bands lying between 1.3 and 1.61 micrometers.

The advantage of these 1.3 to 1.61 micrometer bands results from the fact that current optical fibers, made of glass, have low attenuation and the optical signals can therefore be transmitted over large distances. In what follows, the invention will be explained with reference to this spectral band, although it should be understood that the invention may be applied to other bands if the need arises, by using materials suitable for these different bands.

In a fiber-optic telecommunication network, a cable comprising a plurality of optical fibers can be used to form a plurality of different transmission channels; time division multiplexing of the information may also be carried out in order to achieve the same objective; with a view to further increasing the information delivery capacity of the network, however, the current trend is for a plurality of light wavelengths, modulated independently of one another and each defining an information channel, to be transmitted simultaneously on the same optical fiber. ITU (International Telecommunications Union) Standard 692 proposes the definition of adjacent channels with an optical spectral bandwidth of 100 GHz, centered on N adjacent standardized optical frequencies whose values are 200 terahertz, 199.9 terahertz, 199.8 terahertz, etc., corresponding to N wavelengths of from 1.52 micrometers to 1.61 micrometers. Modulation of the light at from 10 to 20 gigabits per second can be carried out on a channel having this bandwidth, without too much risk of interference between the immediately adjacent spectral bands (by using modulation pulses of Gaussian shape in order to minimize the passband occupied by this modulation). This technique of frequency division multiplexing is referred to as DWDM, standing for "Dense Wavelength Division Multiplexing".

In a telecommunication network, the problem is therefore that of being able to collect the light corresponding to a determined channel without perturbing the light of the neighboring channels. At a transmission node of the network, which is assigned to the transmission and reception of information on channel i, for example, it is necessary to be able to collect the light at the central frequency $F_i$ (wavelength $\lambda_i$) without impeding transmission of the light modulating the central frequencies $F_1$ to $F_N$, even though these optical frequencies are very close together.

To that end, there is a need to produce optical filtering components which are highly selective for light wavelengths and are capable of transmitting the central optical frequency $F_i$ and the frequencies lying in a narrow band of less than 50 GHz on either side of this frequency, and of blocking the other bands. Only the light of channel i is collected at the output of such a filter, and this can be demodulated in order to collect the useful information.

It has already been proposed to produce filtering components that operate on the principle of Fabry-Pérot interferometers, which are produced by depositing semiconductor layers separated from one another by air gaps with thicknesses calibrated according to the wavelength $\lambda_i$ to be selected. In practice, an interferometer comprises two mirrors made of stacked dielectric layers (Bragg mirrors) with a high coefficient of reflection, which are separated by a transparent zone with an optical thickness of $k \cdot \lambda_i$ (real thickness $k \cdot \lambda_i$ if the zone is an air gap), where k is an integer defining the order of the interferometric filter. Indium phosphide (InP) is highly suitable for these embodiments, in particular because of its transparency for the wavelengths in question, its very high refractive index and the possibility of depositing epitaxial layers with a well-controlled thickness.

If the thicknesses of the layers and the intervals between layers are very well controlled, and if the materials have a high refractive index, such a filter turns out to be highly selective.

Such an embodiment is described in the article by A. Spisser et alii, "Highly Selective 1.55 micrometer InP/airgap micromachined Fabry-Pérot filter for optical communications" in Electronics Letters, No 34(5), pages 453–454, 1998. Other embodiments, made of micromachined silicon and of alloys based on gallium arsenide, have been proposed.

These filters may be tunable by varying the thickness of the Fabry-Pérot resonant cavity, that is to say the transparent zone separating the two mirrors. The cavity is delimited by two opposing semiconductor layers, the spacing of which is defined very precisely during fabrication; by making an electrical contact on each of them (the layers being assumed to be sufficiently conductive or coated with a conductive material), a DC voltage can be applied that creates electrostatic forces between the opposing layers, tending to modify the spacing in a controlled way.

It has been shown that it is possible to produce interferometric filters whose layers are suspended from micromachined suspension arms with a thickness small enough so that a voltage of a few volts is sufficient to modify the tuning of the filter over about one hundred nanometers, for example throughout the wavelength range of the standardized band of from 1.52 to 1.61 micrometers. The nominal thickness of the cavity is 0.785 micrometers, for example, and applying a voltage of the few volts makes it possible to vary this thickness by 100 or 200 nanometers up or down, which is sufficient to modify the tuning of the filter throughout the spectral band of the ITU standard. In practice, the tuning may be modified by 1 GHz per millivolt, which is very satisfactory since it is then possible to change channel with a control voltage modification of from 50 to 100 millivolts.

It is, then, sufficient to establish a correspondence table between a channel number (and therefore a central wavelength) and a control voltage to be applied for selecting any one of the channels, and to send the output of the filter to a demodulator (photodetector) which converts the information carried by this channel into an electrical signal.

It will, however, be understood that the tuning conditions would be easy to control if the central frequencies were far apart, for example separated by 1 terahertz, but that they are much more difficult to control when the spacing is only 100 gigahertz. This is because even at transmission, the frequency of a laser which emits the carrier of channel i may experience fluctuations and drifts due to temperature or to ageing (of the order of a few tens of gigahertz).

It is therefore desirable to slave the control voltage of the filter once it has been locked onto the correct central frequency, in order to maintain this voltage subsequently.

SUMMARY OF THE INVENTION

The slaving systems which have been provided are bulky and expensive to produce, in particular because of the opto-mechanical components necessary for the operation (couplers, optical fiber connectors, mirrors, etc.).

The present invention provides a tunable optical filtering component which comprises, in a micromachined monolithic structure containing the optical filter proper, a low-absorption light detection element used for slaving the tuning control of the filter, this element transmitting the majority of the filtered light and therefore substantially not perturbing the optical transmission of the filter.

This detection element collects a very small fraction of the light transmitted in the intended band, and converts this fraction into an electrical signal which can therefore be used, after averaging over a certain time, as an electrical control signal for slaving that tends to maintain the tuning of the filter at a value which maximizes the averaged detected signal. The majority of the light at the selected wavelength passes through the filter and the detection element, and it can be used elsewhere, in particular for purposes of modulating the useful signal. Because of its lower absorption, the detection element placed in the monolithic structure does not perturb the transmission of information, and it is only used for purposes of slaving the tuning of the filter itself. The slaving is carried out on the received light and therefore takes into account the wavelength fluctuations at transmission.

The component according to the invention preferably includes a transparent semiconductor substrate (the concept of transparency relates of course to the wavelengths of the band in question), on the front face of which a stack of likewise transparent layers is formed constituting a tunable interferometric filter that selectively transmits the light in a narrow spectral band, centered on a wavelength which can be adjusted by an electrical voltage, the light detection element being formed on the front face of the substrate, between the substrate and the filter. It is also possible to envisage a configuration in which the illumination is carried out via the rear face of the substrate, the detection element then being placed above the filter.

The substrate is preferably made of indium phosphide, and the interferometric filter includes a plurality of indium phosphide layers separated by intervals of controlled width, at least one of which intervals has a width that can be varied under the control of an electrical voltage in order to tune the filter. The intervals are preferably produced in the form of air gaps, although some of them may be filled with a transparent material having a refractive index different to that of the indium phosphide layers.

The photoelectric detector is preferably produced by means of a quantum-well photodiode. The latter consists of at least one P-type doped semiconductor layer, a semiconductor layer that is not intentionally doped, and an N-type doped semiconductor layer, these three layers being semiconductor epitaxial layers (lattice-matched or nearly lattice-matched with the indium phosphide), and a very thin epitaxial layer of a different semiconductor alloy, which is inserted into the layer that is not intentionally doped. This very thin layer is made of a material having an energy "gap", that is to say an energy interval between the conduction band and the valence band, of about 0.775 electron volts, corresponding to strong absorption in the optical wavelength band of from 1.5 to 1.6 micrometers. The thickness of the very thin epitaxial layer is small enough to avoid the generation of dislocations by plastic relaxation of this layer, in spite of the crystal lattice differences liable to exist between this layer and the semiconductor layers (principally indium phosphide) which enclose it. This thickness is preferably less than 10 to 20 nanometers, in order to limit the absorption of light to a value of the order of 1 percent.

By using a quantum-well detector whose absorption is low because of the very small thickness of the absorbent layer, the transmission of the light flux in the monolithic component is not perturbed. The absorption is preferably less than 1 to 2% in total.

The semiconductor alloy layer constituting the quantum well in the InP layer is preferably made of $In_xGa_{1-x}As$, where x is selected so that the gap of the material, corrected for quantization and strain effects, is about 0.775 electron volts in order to absorb wavelengths up to about 1.63 micrometers. The number x is preferably 0.532. It may vary slightly around this value, preferably in the range of from 0.53 to 0.63, in which case the layer has a mismatched crystal lattice in relation to the indium phosphide and its thickness should be limited to from 5 to 20 nanometers. The semiconductor alloy could also be InGaAsP.

BRIEF DESCRIPTION OF THE DRAWINGS

Other characteristics and advantages of the invention will become apparent on reading the following detailed description which is provided with reference to the appended drawings, in which.

BRIEF DESCRIPTION OF THE INVENTION

The invention will be described in relation to a filter formed on an indium phosphide substrate, for an application to fiber-optic telecommunications in a broad spectral band of from 1.52 to 1.61 nanometers.

The filter is designed, on the one hand, in order to transmit a narrow spectral band around a wavelength $\lambda_i$ and, on the other hand, in order to reflect the wavelengths outside this band. It is tunable in order to give the wavelength $\lambda_i$ any value throughout the broad spectral band.

To that end, it consists of a Fabry-Pérot resonant cavity, that is to say a cavity (C) of air or a medium with an index $n_0$ between two parallel dielectric mirrors M1 and M2. The distance D between the mirrors is an integer multiple (k) of half the wavelength to be selected: $D=k\lambda_i/2n_0$. The mirrors each consist of an alternating sequence of a plurality of dielectric layers with different refractive indices and well determined thicknesses. In principle, k is selected to be equal to 1 (cavity with single-mode resonance) because, if k is different than 1 (cavity with multimode resonance), the cavity will be transparent not only for $\lambda_i$ but also for other wavelengths separated from one another by $\lambda_i/k$.

The more reflective the mirrors are, the higher is the selectivity of the filter for the selected wavelength. The mirrors are commensurately more reflective as the difference in the refractive indices of the alternating dielectric layers is high. In the preferred example which is described, the alternating sequence consists of layers of indium phosphide (refractive index $n_1$ greater than 3, and of air, which is very favorable although other pairings of transparent dielectric layers could be envisaged. The reflection is commensurately more independent of the wavelength as there are few layers in the alternating sequence. A high difference in indices between the layers of the alternating sequence, however, makes it possible to obtain very high reflection even with a very small number of layers in each mirror.

In particular, it is possible to produce the mirrors M1 and M2 with only two layers of indium phosphide each, separated by a layer of air.

Lastly, a high reflection of the mirrors is achieved by an expedient selection of the relative thicknesses of the layers of the alternating sequence, taking into account their respective refractive indices: the optical thickness of each layer, that is to say the real thickness divided by the optical index, is an odd multiple of one quarter of the wavelength for each of the layers of air or indium phosphide. The average wavelength $\lambda_m$ (about 1.55 micrometers) of the broad spectral brand in which the filter operates will preferably be used for these thickness selections.

Figure 1:
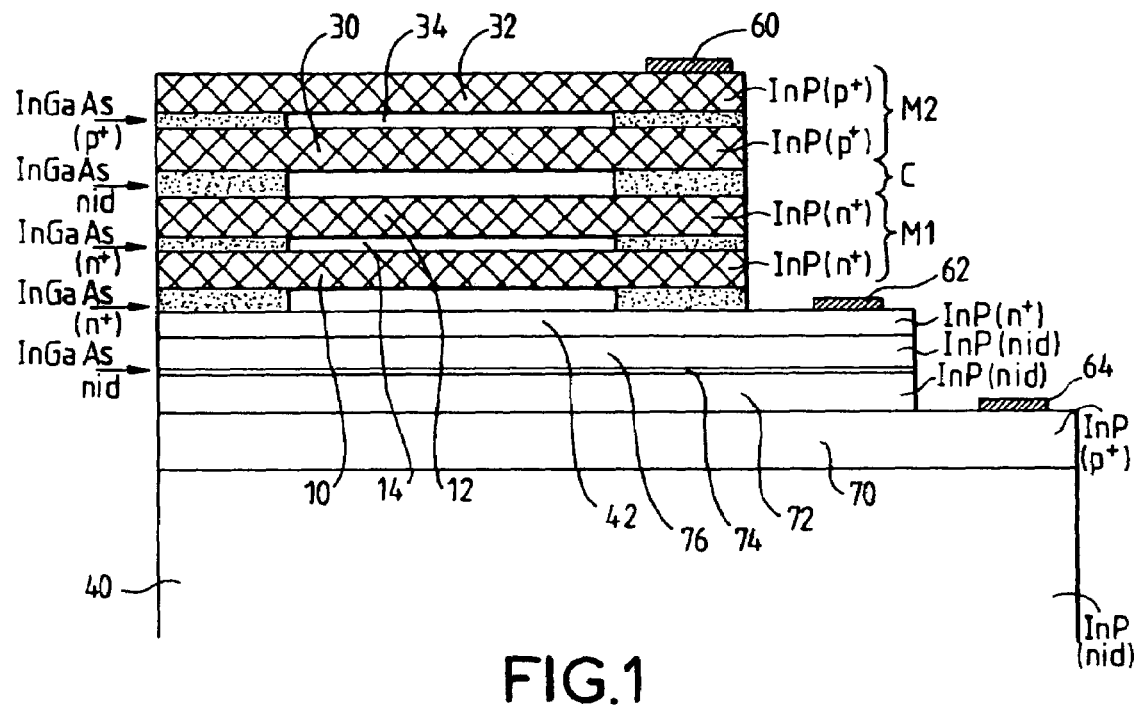
FIGS. 1 to 3 represent the schematic structure of a monolithic interferometric filter according to the invention, respectively in cross section, in plan view and in perspective.

In the example of FIG. 1, the lower mirror M1 consists of two layers of indium phosphide 10 and 12 (refractive index $n_1$) with an optical thickness $5\lambda_m/4$, and therefore a real thickness $5\lambda_m/4n_1$, which are separated by a layer of air 14 (index $n_0$) with an optical thickness and real thickness $\lambda_m/4$.

Like the mirror M1, the upper mirror M2 consists of two layers of indium phosphide (30 and 32) (refractive index $n_1$) with an optical thickness $5\lambda_m/4$, and therefore a real thickness $5\lambda_m/4n_1$, which are separated by a layer of air 34 (index $n_0$) with an optical thickness and real thickness $\lambda_m/4$.

The parallel-faced cavity C is an air cavity between the layers 12 and 30, the thickness of which is $\lambda_i/2$ in order to obtain selective filtering (single-mode) at the wavelength $\lambda_i$. It will be seen that this thickness is adjustable around a nominal design value D. The design value D may be $\lambda_m/2$, in which case the thickness needs to be varied positively and negatively in order to obtain tuning throughout the broad spectral band. It is also conceivable that the nominal thickness D may correspond instead to tuning at one of the ends of the broad spectral band, and for this thickness to be varied in only one direction in order to cover the entire band.

This filter therefore consists of an alternating sequence of parallel transparent indium phosphide layers, separated by layers of air, and it is produced by micromachining a monolithic indium phosphide substrate 40 by suitable operations of epitaxial layer deposition and etching on the substrate. The fabrication, which uses in particular the deposition of semiconductor materials other than indium phosphide, in particular gallium-indium arsenide, will be discussed further on. These materials remain present on the substrate throughout the resonant-cavity filter and constitute spacers, which support the indium phosphide layers and which define the thickness of air gaps. These materials are selected on the one hand for their semiconductor properties and, on the other hand, for their ability to be etched selectively with respect to the indium phosphide.

The lower layer 10 of the mirror M1 is preferably separated from the last epitaxial layer 42 deposited on the underlying substrate 40, by a layer of air with an optical thickness close to $\lambda_m/2$ or a multiple of $\lambda_m/2$ in order to facilitate transmission of the wavelength $\lambda_i$ toward the substrate. The epitaxial layer 42 is used as a support base for the filter deposited above.

The light arrives from the top (on the same side as the mirror M2), for example through an optical fiber carrying a plurality of optical telecommunication channels, including one channel i at the wavelength $\lambda_i$; this wavelength is selected by the interferometric filter (mirrors M1, M2, cavity C), and only the narrow spectral band around $\lambda_i$ passes through the filter and reaches the indium phosphide substrate 40. The substrate is transparent and the light is collected on the other side of the substrate, where the information present in channel i can be detected and processed. The rest of the light is reflected by the Fabry-Pérot filter.

Figure 2:
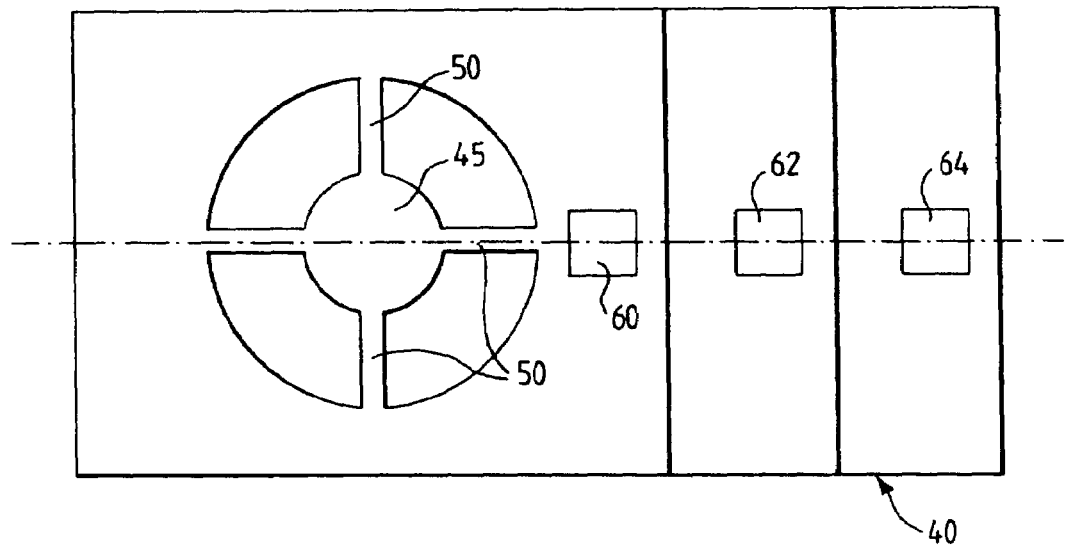
Figure 3:
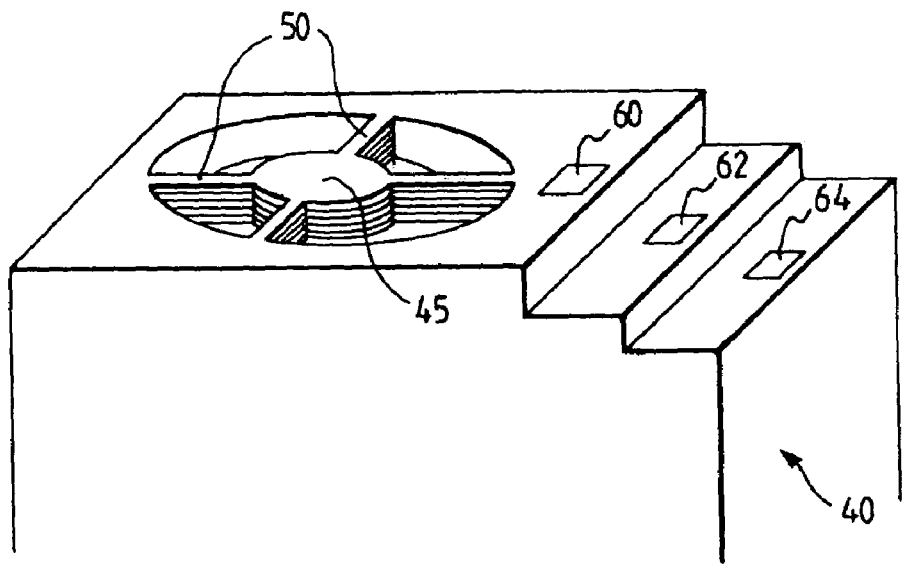

The filter is made tunable in the following way: the various indium phosphide dielectric layers are constructed in the form of central surfaces 45 (for example disk-shaped) suspended by suspension arms 50, as can be seen in FIGS. 2 and 3. The stiffness of these arms is sufficient to keep the layers accurately parallel to one another, but it is low enough so that, taking into account the distance $\lambda_m/2$ between the two indium phosphide layers 12 and 30 which enclose the cavity C, it is possible to move these layers toward one another by electrostatic forces produced on these layers, against the stiffness of the arms 50. A few volts applied between the layers may be sufficient to modify the distance between the layers by 5% or more, depending on the stiffness of the arms.

The layers are semiconductor layers, and they are doped in order for their natural conductivity to be high enough so that it is unnecessary to provide electrodes on the layers. Electrical contacts are established on the layers in order to apply the appropriate potential difference between them, through the suspension arms. The figures represent an electrical contact 60 for connection to the layer 30 (through the layer 32 and a spacer layer of gallium-indium arsenide, as mentioned above) and an electrical contact 62 for connection to the layer 12 (likewise through a plurality of other layers).

The determined potential difference corresponds to a determined spacing D+δD between the layers 12 and 30, and therefore to a determined cavity thickness and hence to transmission for a determined wavelength. It is therefore possible to establish a functional table for selection of a given optical channel by applying the predetermined potential difference between the contacts 60 and 62, which corresponds to tuning on this channel.

According to the invention, a photoelectric detector which forms part of the monolithic component, and which is produced by depositing and etching layers on the substrate, is interposed between the substrate 40 and the alternating sequence of dielectric layers which forms the interferometric filter. This detector is preferably one with very low absorption for the wavelengths in question (1.52 to 1.61 micrometers), but not with zero absorption. The absorption is preferably about 1 to 2%.

The detector delivers an electrical signal representing a small fraction of the light energy transmitted by the filter. If this electrical signal is filtered by sending it through a lowpass filter, for example a filter with a time constant of from 1 microsecond to a millisecond, that is to say one which is long compared with the modulation period (less than one nanosecond) of the information present in the channel, it is possible to determine an average power passing through the filter. This average power is larger if the filter is well tuned than if the filter is poorly tuned. The signal output by the photoelectric detector thereby integrated in the monolithic component, is used as an input signal for the circuit for slaving the tuning of the filter. The slaving is designed so that the filter is tuned to a wavelength such that the average power collected by the detector is maximal. Since there is of course a maximum for each active transmission channel, the slaving is initialized by tuning the filter approximately to a channel (for example to within 50 gigahertz) and by preventing tuning voltage excursions extending beyond a limit corresponding to a tuning frequency shift of about 50 gigahertz. After this initialization on a given channel, the slaving fulfills its function by keeping the filter exactly tuned to the incident optical frequency, in spite of the variations in this frequency at transmission.

The detector is therefore integrated in the monolithic component, but it does not prevent almost all of the light power available in channel i from being transmitted onto the other side of the substrate 40, after having passed through the filter. This light power can be processed as required.

In order to produce such a low-absorption integrated photoelectric detector, although indium phosphide is transparent for the wavelengths in question since it has a gap of about 1.3 electron volts, it is preferable to produce a quantum-well detector consisting essentially of an indium phosphide PIN diode, into which a very thin additional epitaxial layer (quantum layer) of a ternary compound (such as InGaAs) or a quaternary compound (such as InGaAsP) has been inserted. The compound is such that it has a gap corresponding to high absorption of the useful wavelengths of from 1.52 to 1.61 micrometers. It is also such that its crystal lattice is similar to that of indium phosphide. Its thickness is small enough to allow epitaxial deposition of this layer on the indium phosphide without dislocation, even if there is a crystal lattice difference. The thickness is preferably not more than from 5 to 20 nanometers, depending on the composition of the layer.

The very thin quantum layer lies in the middle of the intrinsic layer I of the PIN diode. One of the layers P or N of the PIN diode may be connected directly or indirectly to the contact 62, in order to permit biasing of the PIN diode and collection of a detection signal; if the contact 62 cannot be used for this purpose (it is already being used to apply the tuning voltage of the filter), then it is necessary to provide an additional contact dedicated to making a first contact for the PIN diode. A second contact 64 may be provided on the other side of the PIN diode.

The details of the epitaxial layers deposited in the preferred example being described are as follows, the substrate 40 preferably being made of indium phosphide that is not intentionally doped (n.i.d.) or of semi-insulator, so that it is indeed transparent (doping increases the absorption of the photons).

$p^+$ doped InP epitaxial layer 70, on which the contact 64 can be made directly, forming the P layer of the PIN diode;

InP epitaxial layer 72 forming a first part of the intrinsic layer I of the PIN diode;

quantum layer 74: a very thin epitaxial layer of gallium-indium arsenide, with the formula $In_xGa_{1-x}As$, where x is selected in order to obtain an energy gap of about 0.7 volts between the valence band and the conduction band, which allows good absorption of the photons in the broad spectral band of from 1.52 to 1.61 micrometers; x may be equal to the value 0.532, which is conventionally selected when wishing to match the crystal lattice of gallium-indium arsenide exactly to the lattice of indium phosphide. The thickness of the layer may be about 15 nanometers in this case, so as to obtain about 1% absorption by the detector. Different values of x may be selected, however, in particular in the range x=0.53 to 0.65. In this case, the crystal lattice is slightly mismatched in relation to that of the indium phosphide, and the thickness of the layer will accordingly be limited in order to avoid dislocations; this thickness limitation is moreover not problematic in terms of the absorption, which increases when x increases. For x=0.55, a thickness of 10 nanometers ought to be suitable for 1% absorption. For x=0.625, the thickness of the layer should be limited to 5 nanometers, again allowing about 1% absorption. Even if there is lattice mismatching, the small thickness of the quantum epitaxial layer allows the deposition of this layer to follow the lattice of the indium phosphide epitaxially (albeit with strains); with this thickness, the strains do not engender any dislocations; furthermore, the small thickness of gallium-indium arsenide leads to low absorption of the light, making it possible both to create a useful detection signal and to keep the majority of the radiation for another use;

indium phosphide epitaxial layer 76, not intentionally doped, constituting the second part of the intrinsic layer I of the PIN diode; the epitaxial growth maintains the original crystal lattice of the substrate 40, since the gallium-indium arsenide layer has also kept to it;

aforementioned epitaxial layer 42 of $n^+$ doped indium phosphide forming the last layer before formation of the Fabry-Pérot cavity; the contact 62 is made on this layer so that the contacts 62 and 64 respectively give access to the P and N layers of the PIN diode, allowing it to operate as a detection photodiode.

Figure 4:
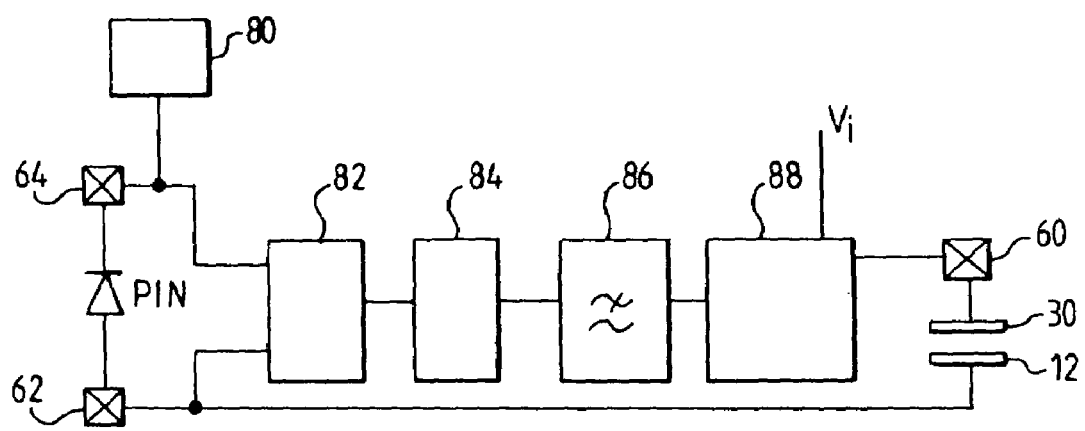
FIG. 4 represents a circuit diagram for optical frequency slaving associated with the filter.

FIG. 4 represents the way in which the electrical contacts of the component may be inserted into a circuit for slaving the tuning of the filter: the PIN diode, reverse-biased by a biasing circuit 80, delivers a signal in the form of a voltage or current to the detection circuit 82. The detection circuit delivers a voltage representing the quantity of light instantaneously passing through the quantum layer 74. This voltage, optionally amplified by an amplifier 84, is applied to a lowpass filter 86 whose time constant is much longer than the period of the pulses modulating the light of the optical channel at the wavelength $\lambda_i$. The time constant may, for example, be 1 microsecond or more.

The output voltage of the lowpass filter is applied to a slaving circuit proper 88, which delivers a signal tending to maintain the output voltage of the lowpass filter at a maximum value. Such a circuit establishes a control voltage to be applied to the optical filter, as a function of the sign of the derivative of the voltage variation across the terminals of the lowpass filter. This control voltage is applied between the layers 12 and 30, and therefore between the contacts 62 and 60. It is such that, if a variation in the control voltage of the optical filter is tending to increase the output voltage of the lowpass filter, the slaving filter tends to continue the variation of the control voltage in the same direction, but, if a variation in the control voltage of the optical filter is tending to decrease the output voltage of the lowpass filter, the slaving circuit tends to reverse the direction of this variation. The control voltage of the filter (between the electrodes 60 and 62) is thereby slaved to the position which gives the maximum optical power in the detector (between the electrodes 62 and 64).

The slaving circuit comprises means for establishing an approximate voltage $V_i$, representing the theoretical voltage which it is necessary to apply to the optical filter in order to obtain tuning on channel i in principle. The slaving circuit will deliver a voltage between the contacts 60 and 62, which varies around $V_i$ within limits narrow enough not to risk latching onto a neighboring channel.

Returning to FIG. 1, the presence of spacers throughout the periphery of the Fabry-Pérot resonant cavity may be noted. These spacers consist of semiconductor layers that are not made of indium phosphide, and which define the thicknesses of the air gaps between the layers of indium phosphide.

The reason why these spacers are not made of indium phosphide is a technological region, associated with the production of the air gaps by selective elimination of the layers deposited between two layers of indium phosphide. A material is selected which has the same crystal lattice as indium phosphide, in order to maintain epitaxial growth from one layer to the next, but which can be eliminated selectively by an attack product which does not attack the indium phosphide. The selected spacer material is preferably a ternary alloy InGaAs, the composition of which is the one having the crystal lattice most similar to InP, namely $In_{0.53}Ga_{0.47}As$.

The fabrication of the stack of layers with spacers is carried out in the following way: deposition of an InP epitaxial layer, then deposition of a lattice-matched InGaAs layer, followed by deposition of the second InP epitaxial layer. Etching of this last layer according to a precise pattern (in this exemplary embodiment: disk with suspension arms) until the InGaAs layer is exposed. Attack of the InGaAs layer with a product that does not attack InP, with lateral undercut etching, that is to say InGaAs is removed even under the INP parts which are protecting it. Only the spacers which can be seen around the resonant cavity in the figures are kept, and the InP layers remain suspended with air gaps interposed between them.

The doping of the various layers of indium phosphide and gallium indium arsenide takes into account the facts that potentials need to be applied through them, and that it is necessary to create junctions so as to apply a control potential between the contacts 60 and 62. To be able to apply a voltage between the InP layer 12 and the InP layer 30, through the contacts 60 and 62, the following stack structure is accordingly provided above the InP layer 42 which, it will be recalled, is $n^+$ doped:

$n^+$ doped $In_{0.53}Ga_{0.47}As$ spacer layer
$n^+$ doped InP layer 10
$n^+$ doped $In_{0.53}Ga_{0.47}As$ spacer layer
$n^+$ doped InP layer 12

$In_{0.53}Ga_{0.47}As$ spacer layer not intentionally doped; it would be better if this layer were completely insulating; since it is not, it is necessary for the upper layers to be $p^+$ doped in order to avoid a direct short circuit between the contacts 60 and 62. The biasing between these contacts is then reverse (positive on the $n^+$ layers, negative on the $p^+$ layers);

$p^+$ doped InP layer 30
$p^+$ doped $In_{0.53}Ga_{0.47}As$ spacer layer
$p^+$ doped InP layer 32.

The contacts 60 and 64 on the $p^+$ doped InP layers may be made of an alloy based on gold and zinc; the contact 62 on an $n^+$ doped InP layer may be made of gold.

To apply a tuning control voltage of the filter, a reverse-biasing potential difference will be applied to the junctions, that is to say the more positive potential on the contact 62 and the more negative potential on the contact 60.

The invention claimed is:

1. A tunable optical filtering component for receiving incident light, rejecting undesired wavelength bands and allowing free passage of a selected wavelength band towards a downstream device which will use light in the selected wavelength band, said unable optical component comprising:
    a tunable optical filter made in a micro-machined monolithic structure, the micro-machined monolithic structure including:
    a light detection element having low light absorption for the selected wavelength band,
    said light detection element placed downstream of the tunable optical filter in the direction of incident light,
    said component further comprising:
    circuitry for receiving an electrical signal from an output of the light detection element and for slaving a tuning control input of the filter to tune the filter on one wavelength of light transmitted through the filter,
    whereby light passing through the detection element is transmitted to said downstream device for use in said downstream device without being significantly absorbed in said detection device.

2. The filtering component as claimed in claim 1, wherein said filtering component includes a transparent semiconductor substrate, on the front face of which a stack of likewise transparent layers is formed constitutes a tunable interferometric filter that selectively transmits the light in a narrow spectral band, centered on a wavelength which can be adjusted by an electrical voltage, the light detection element being formed on the front face of the substrate, between the substrate and the filter.

3. The filtering component as claimed in claim 1, wherein said filtering component includes a transparent semiconductor substrate, on the front face of which a stack of likewise transparent layers is formed constituting a tunable interferometric filter that selectively transmits the light in a narrow spectral band, centered on a wavelength which can be adjusted by an electrical voltage, the light detection element being formed above the filter.

4. The filtering component as claimed in claim 1, wherein the substrate is made of indium phosphide and the interferometric filter includes a plurality of indium phosphide layers separated by intervals of controlled width, at least one interval (C) of which has a width that can be varied under the control of an electrical voltage.

5. The filtering component as claimed in claim 4, wherein the substrate is made of not intentionally doped or semi-insulator.

6. The filtering component as claimed in claim 4, wherein the intervals are air gaps.

7. The filtering component as claimed in claim 1, wherein the detector includes a quantum-well photodiode.

8. The filtering component as claimed in claim 7, wherein the photodiode includes a P-type doped semiconductor layer, a semiconductor layer that is not intentionally doped, and an N-type doped semiconductor layer, these three layers being semiconductor epitaxial layers, and a very thin epitaxial layer of a different semiconductor alloy, which is inserted into the layer that is not intentionally doped.

9. The filtering component as claimed in claim 8, wherein the very thin epitaxial layer is made of a material having an energy gap of about 0.775 electron volts, corresponding to absorption in the optical wavelength band of from 1.5 to 1.6 micrometers, the thickness of the very thin epitaxial layer being small enough to avoid dislocations of this layer in spite of the crystal lattice differences liable to exist between this layer and the semiconductor layers which enclose it.

10. The filtering component as claimed in claim 9, wherein the thickness of the very thin epitaxial layer is less than 20 nanometers.

11. The filtering component as claimed in claim 8, wherein the photodiode is made from layers of indium phosphide, the very thin epitaxial layer being made of gallium-indium arsenide $In_xGa_{1-x}As$, where x lies between about 0.53 and 0.63.

12. The filtering component as claimed in claim 1 wherein the absorption of light in the detector is of the order of from 1 to 2% at most.

13. A method for tuning a tunable optical component as claimed in claim 1, comprising the steps of:
- collecting from the detection element a signal representing a small fraction of the light passing trough this element;
- averaging this signal and in producing from the average signal an electrical control signal for slaving the tuning of the filter; and
- tuning the filter at a value which maximizes the averaged detected signal.

14. The filtering component as claimed in claim 2, wherein the substrate is made of indium phosphide and the interferometric filter includes a plurality of indium phosphide layers separated by intervals of controlled width, at least one interval (C) of which has a width that can be varied under the control of an electrical voltage.

15. The filtering component as claimed in claim 5, wherein the intervals are air gaps.

16. The filtering component as claimed in claim 9, wherein the photodiode is made from layers of indium phosphide, the very thin epitaxial layer being made of gallium-indium arsenide $In_xGa_{1-x}As$, where x lies between about 0.53 and 0.63.

17. The filtering component as claimed in claim 10, wherein the photodiode is made from layers of indium phosphide, the very thin epitaxial layer being made of gallium-indium arsenide $In_xGa_{1-x}As$, where x lies between about 0.53 and 0.63.

18. The filtering component as claimed in claim 8, wherein the absorption of light in the detector is of the order of from 1 to 2% at most.

19. The filtering component as claimed in claim 13, wherein said filtering component includes a transparent semiconductor substrate, on the front face of which a stack of likewise transparent layers is formed constitutes a tunable interferometric filter that selectively transmits the light in a narrow spectral band, centered on a wavelength which can be adjusted by an electrical voltage, the light detection element being formed on the front face of the substrate, between the substrate and the filter.

20. The filtering component as claimed in claim 13, wherein said filtering component includes a transparent semiconductor substrate, on the front face of which a stack of likewise transparent layers is formed constituting a tunable interferometric filter that selectively transmits the light in a narrow spectral band, centered on a wavelength which can be adjusted by an electrical voltage, the light detection element being formed above the filter.

* * * * *